United States Patent [19]

Matsumoto

[11] 4,123,794
[45] Oct. 31, 1978

[54] MULTI-COMPUTER SYSTEM

[75] Inventor: Yoshihiro Matsumoto, Tokyo, Japan

[73] Assignee: Tokyo Shibaura Electric Co., Limited, Tokyo, Japan

[21] Appl. No.: 752,909

[22] Filed: Dec. 21, 1976

Related U.S. Application Data

[63] Continuation-in-part of Ser. No. 549,926, Feb. 14, 1975, abandoned.

[30] Foreign Application Priority Data

Feb. 15, 1974 [JP] Japan .................................... 49-17536

[51] Int. Cl.² .................................................. G06F 15/16
[52] U.S. Cl. ................................. 364/101; 235/303.4; 364/119; 364/200
[58] Field of Search ................... 340/172.5; 235/303.4; 364/200, 900, 101, 102, 119

[56] References Cited

U.S. PATENT DOCUMENTS

| | | | |
|---|---|---|---|
| 3,560,934 | 2/1971 | Ernst et al. | 445/1 |
| 3,579,197 | 5/1971 | Stapleford | 445/1 |
| 3,634,830 | 1/1972 | Baskin | 364/200 |
| 3,848,234 | 11/1974 | MacDonald | 445/1 |

Primary Examiner—Charles E. Atkinson
Attorney, Agent, or Firm—Oblon, Fisher, Spivak, McClelland & Maier

[57] ABSTRACT

A multi-computer system is disclosed which is composed of a plurality of interconnected computers, one of which operates as a schedule master for the others. Information stored in a bulk memory device is pre-loaded into the schedule master before the time at which an invocation from an industrial process occurs, and then the same is transferred into any one of the computers for process control. The advanced time at which the information is pre-loaded into the schedule master is varied in accordance with the load on the multicomputer system.

10 Claims, 11 Drawing Figures

MULTI-COMPUTER SYSTEM

CROSS REFERENCE TO RELATED APPLICATIONS

This pplication is a continuation-in-part of Ser. No. 549,926 filed Feb. 14, 1975, now abandoned.

BACKGROUND OF THE INVENTION

1. Field of the Invention:

This invention relates to a multi-computer system in which a plurality of computers are employed for controlling an industrial process and more particularly to a multi-computer system in which one computer acts as a schedule master for the others.

2. Description of the Prior Art

In the art of industrial process control, it is well known to increase the level of digital control by using a multi-computer system which includes a plurality of electronic computers. Such multi-computer systems for industrial process control have attracted special interest recently because of the improving cost performance of mini-computers and micro-computers.

In accordance with prior multi-computer systems, the system generally includes a plurality of computers for controlling or inspecting respectively different parts of the industrial process and a bulk memory device commonly accessible through a multi-access controller. Consequently when the system is busy, such as when numerous invocations or requests for creating the activity internal to the computer occur from the industrial process, the multi-access controller is overloaded by many invocations so that many of the latter have to be stored temporarily before internal activities can begin.

This may undesirably cause reduced responsiveness in the industrial process control to which the multi-computer system is applied. If the resulting response time of the control computer is lengthened beyond required limits, appliances in the industrial process which are controlled by the control computer cannot receive appropriate control signals at an appropriate time so that the appliances will not operate properly, producing products having defects and possibly causing faults in the appliances themselves.

SUMMARY OF THE INVENTION

Accordingly an object of the invention is to provide an improved multi-computer system.

Another object of the invention is to provide an improved multi-computer system in which one computer operates as a schedule master for the others.

Still another object of the invention is to provide an improved multi-computer system in which the schedule master is pre-loaded with information from a bulk memory device thereby transferring it to one of the other computers which has incurred an invocation from an industrial process.

A further object of the invention is to provide an improved multi-computer system in which the pre-loading from a bulk memory device into the schedule master is made at a time before the time at which the process requests come to one of other computers.

A still further object of the invention is to provide an improved multi-computer system in which the advanced time at which the information is pre-loaded from the bulk memory device can be varied in accordance with the load on the multi-computer system.

Briefly, these and other objects and advantages of the invention are realized by a multi-computer system which comprises a plurality of local computers each located at a position capable of communicating with a part of an industrial process, at least one bulk memory device, a multi-access controller for selectively coupling the local computers with the bulk memory device. One of the local computers operates as a schedule master to the others and all local computers are connected to each other, whereby information stored in the bulk memory device is pre-loaded in the schedule master to be transferred into any one of the local computers in response to an invocation or request information from the industrial process. The pre-loading of the schedule master is preformed at a time before the time at which the invocation of the industrial process occurs, and this advanced time is varied in accordance with the load of a multi-computer system.

BRIEF DESCRIPTION OF THE DRAWINGS

The invention itself, together with further objects and advantages thereof will be better understood by referring to the following description taken in conjunction with the accompanying drawings in which.

DESCRIPTION OF THE PREFERRED EMBODIMENTS

Figure 1:
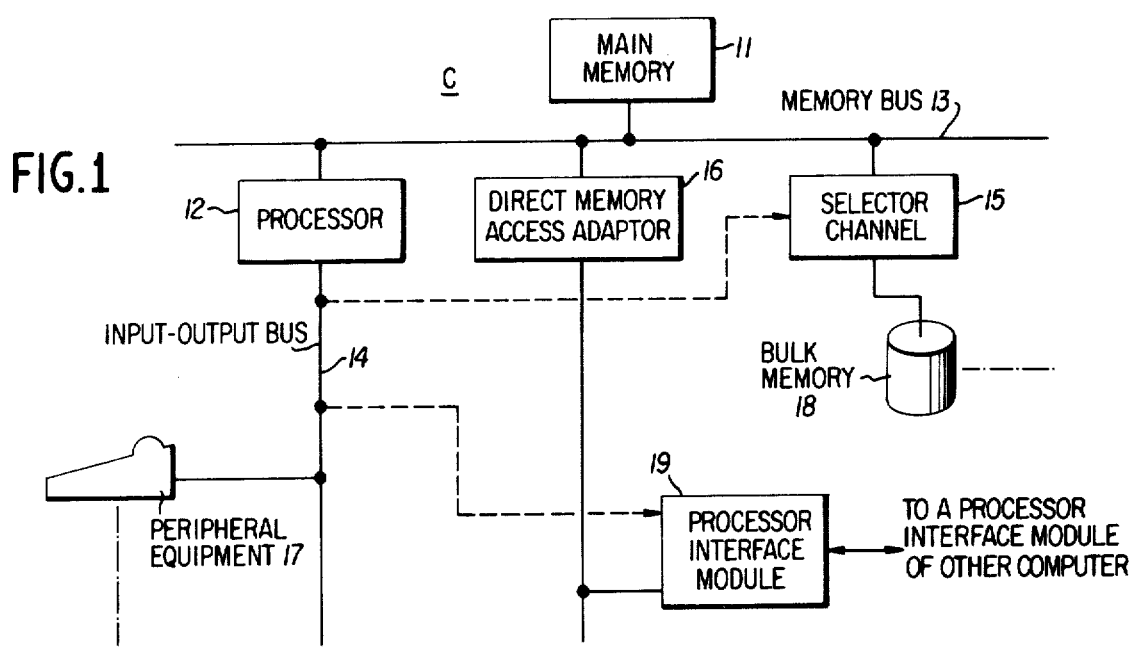
FIG. 1 is a block diagram showing a computer unit.

Referring now to the drawings, wherein like reference numerals designate identical or corresponding parts throughout the several views, and more particularly to FIG. 1 thereof, there is shown a computer unit generally designated by the reference character C and having a main memory 11 and a processor 12 each connected to a memory bus 13. The computer C is connected to peripheral equipment through three devices: an input-out bus 14, a selector channel 15 and a direct memory access adaptor 16. The input-output bus 14 effects the input and output of data to and from the computer C through the processor 12, while the selector channel 15 and direct memory access adaptor 16 are directly connected to memory bus 13 to effect data communication with the main memory 11 under cyclic control of the processor 12.

The input-output bus 14 is provided with peripheral equipment such as a typewriting machine 17 for data input and output. The selector channel 15 is connected to a bulk memory device 18, and the direct memory access adaptor 16 is connected to a processor interface module 19 which is described hereinbelow in more detail. In FIG. 1, solid lines show data paths and dotted lines show control signal paths.

For the multi-computer system of the invention, mini-computers, which are manufactured and sold by Tokyo Shibaura Electric Co., Ltd. in Japan and available commercially under the trade mark "TOSBAC-40C", have been employed. Specifications of the mini-computer are as follows:

Main memory 11:
magnetic core, 0.8μS, 8KB–64KB,
    16 + 1 bits
Processor:
number of instructions: 113,
    direct address unit: 64 KB,
    general registers: 16,
    micro-program control
    input-output functioning — external interruption:
    255 channels,
    input - output bus: 65KB/sec,
    selector bus: 1000 KB/sec,
    memory bus: 2500KB/sec
    options-floating operation, block transfer, memory protection, voltage supply off detection, automatic restart, and others.

Figure 2:
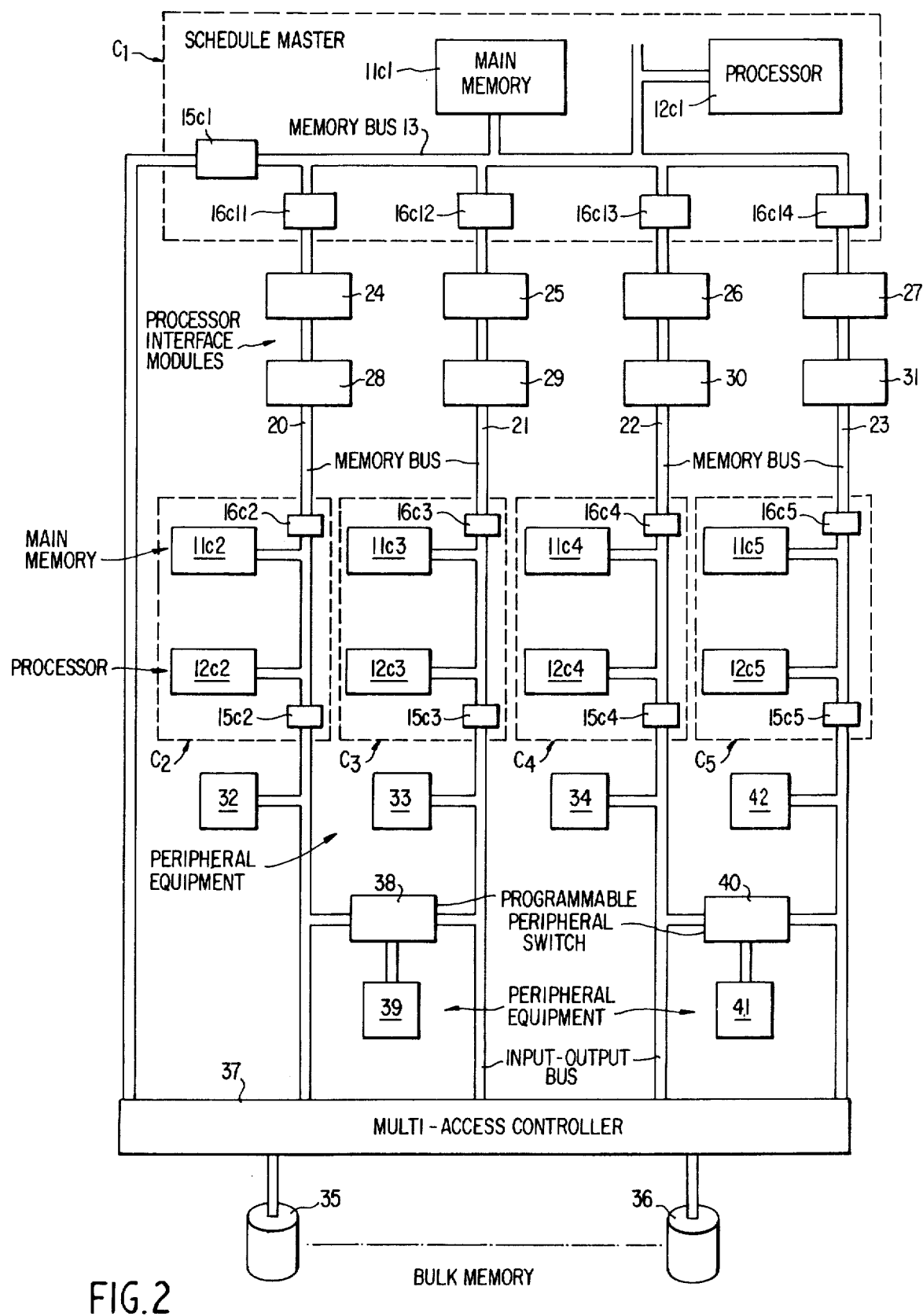
FIG. 2 is a block diagram of a multi-computer system in accordance with one embodiment of the invention.

FIG. 2 shows a multi-computer system in which five computer units $C_1$, $C_2$, $C_3$, $C_4$ and $C_5$ are employed and one of the same $C_1$ operates as a schedule master to the others, $C_2$ to $C_5$. Computers $C_1$ to $C_5$ respectively include main memories 11c1, 11c2, 11c3, 11c4 and 11c5 and processors 12c1, 12c2, 12c3, 12c4 and 12c5. The schedule master or common mini-computer $C_1$ is connected to memory bus 13, and the other computers $C_2$ to $C_5$ are connected to memory buses 20, 21, 22 and 23, respectively.

The computer $C_1$ includes four direct memory access adaptors 16C11, 16C12, 16C13 and 16C14, and it also has a selector channel 15C1.

Each of the other computers $C_2$ to $C_5$ has a direct memory access adapter 16C2, 16C3, 16C4 and 16C5 respectively. Each of them also includes a selector channel 15C2, 15C3, 15C4 and 15C5.

The computer $C_1$ is connected with computers $C_2$, $C_3$, $C_4$ and $C_5$ through four processor interface modules 24, 25, 26 and 27.

The schedule master $C_1$ has the four processor interface modules 24, 25, 26 and 27 each connected to the direct memory access adapter 16C11, 16C12, 16C13 and 16C14. The other computers $C_2$ to $C_5$ also respectively have one processor interfce module 28, 29, 30 and 31 each connected to the direct memory access adaptor 16C2, 16C3, 16C4 and 16C5. These correspond to processor interface modules 24, 25, 26 and 27, thereby to effect data transfer between the conputers $C_2$ to $C_5$ and the schedule master $C_1$.

The external ends of the selector channels 15C2, 15C3, 15C4 and 15C5 are coupled to peripheral equipment units 32, 33, 34 and 42, such as input-output typewriters and the like. The external ends of the selector channels 15C1, 15C2, 15C3, 15C4 and 15C5 are connected to at least one external or bulk memory device as illustrated at 35 and 36 through a multi-access controller 37. The multi-access controller 37 is of a conventional type, such that when a plurality of computers $C_1$ to $C_5$ attempt access to at least one bulk memory device 35 and 36, each computer can effect input-output of the information file independent of the presence of the other computers. The contents of the multi-access controller 37 differs depending upon whether the bulk memory devices 35 or 36 are disk or drum type devices, as is known to those skilled in the art. However the communicating of instructions between the controller 37 and computers $C_1$ to $C_5$ may be accomplished in the same manner. The communicating functions are as follows:

producing file
    withdrawing from file
    renewing file
    adding to file
    file lock and unlock
    erasing file For simplifying the formation of the multi-access controller 37, the main memory 11c1 of the schedule master $C_1$ is used as a buffer memory so as to reduce the working time of the multi-access controller 37 incurred by the computers $C_2$, $C_3$, $C_4$ and $C_5$ to withdraw information from the file.

A programmable peripheral switch 38 is provided for connecting a peripheral equipment unit 39, such as an input-output typewriter, selectively to the memory buses 20 and 21. Similarly a programmable peripheral switch 40 is provided for connecting a peripheral equipment unit 41 selectively to the memory buses 22 and 23. The programmable peripheral switch may be provided between selector channels. In this arrangement, if one of the processors has a failure, the programmable peripheral switch enables the peripheral equipment to be connected to another processor. The computer which is connected to the peripheral equipment may also cause a changeover command to be sent to the programmable peripheral switch. Which computer the peripheral equipment is connected to can be made clear by checking the status register of the programmable peripheral switch. During changeover of the programmable peripheral switch or upon error detection by a watch dog timer, a flag is set in the status register.

Figure 3:
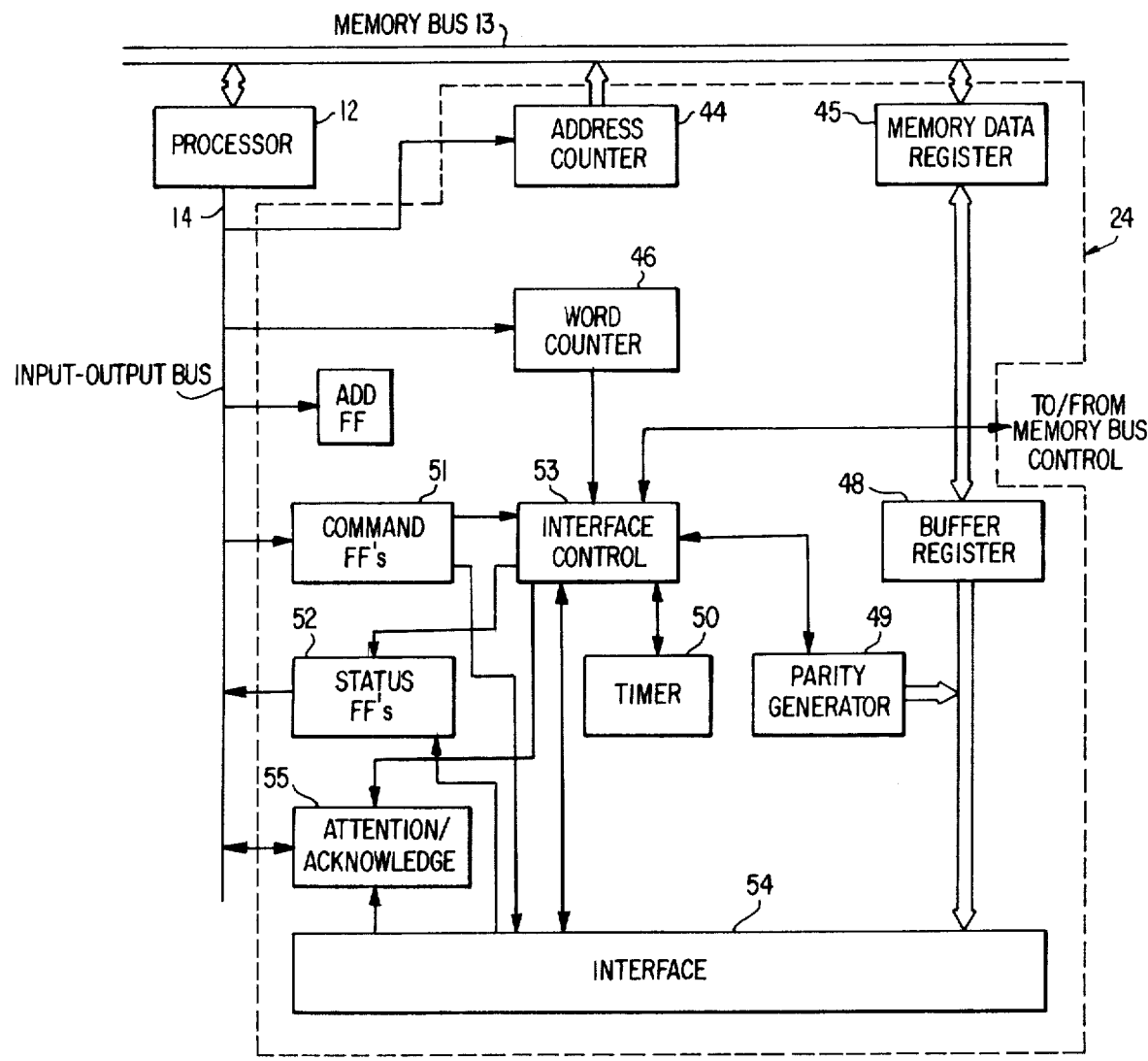
FIG. 3 is a block diagram of a processor interface module in the system of FIG. 2.

As the processor interface modules 24 to 31 have the same construction, only one of the modules 24 is shown in more detail in FIG. 3 and is coupled to a processor 12 connected to memory bus 13 and effecting data processing for the processor interface module 24. The processor interface module 24 also includes an address counter 44 connected to memory bus 13 and an input-output bus 14 connected to processor 12. The address counter 44 is a memory address register in which the start address of a transfer data area in the main memory or core memory 11C1 of computer $C_1$ is set up and the address register contents are incremented by two at every access to the memory. The processor interface module 24 is also provided with a memory data register 45 which is connected to memory bus 13 and operates as a buffer register to set the transferring data therein. A word counter 46 connected to input-output bus 14, is provided for counting the number of words to be transferred. This counter is set to the number of words to be transmitted and is decremented by one for every one word transferred, and stops the transfer operation when its content becomes zero. A buffer register 48 is connected to the memory data register 45 and operates as a buffer to be used when a data-transfer occurs between processor interface modules.

The processor interface module 24 further includes a parity generator 49 to effect vertical parity generation and checking in data transfers by the processor interface module 24. A timer 50, such as a watch dog timer, is provided and operates as a watcher for prevention of lock-up in the processor interface module 24.

Command flip-flops 51 are connected to input-output bus 14 and generate commands as follows under control of the processor 12.

| Bit | 0 | 1 | 2 | 3 | 4 | 5 | 6 | 7 |
|---|---|---|---|---|---|---|---|---|
| Command | request | | reset | clear | transfer set | write | read | |

Status flip-flops 52 are also provided to indicate the status of the processor interface module 24 to the processor 12, and the status words thereof are as follows:

| Bit | 0 | 1 | 2 | 3 | 4 | 5 | 6 | 7 |
|---|---|---|---|---|---|---|---|---|
| Status | Early termination | Error | Request 1 | Request 2 | Busy | Examine Status | Request contention | Device unavailable |

In addition, the processor interface module 24 has an interface control 53 for controlling the aforesaid parts provided therein and an interface 54 for connecting one processor interface module 24 to the other one 28 (FIG. 2).

This system is implemented by execution of several segments. A segment consists of programs and data. A program sets forth executable instructions. All segments are stored in bulk memories 35 and 36. Each segment is executed by computers $C_1$ to $C_5$. In the usual manner the major purpose of the processor C1 i.e. schedule master is to manage current location of segments and that of the computers $C_2$ to $C_5$ is to execute the segments.

The computers $C_2$ to $C_5$ communicate with an industrial process or operators through the peripheral equipment 32, 33, 34, 39, 41 or 42. The computers $C_2$ to $C_5$ detect demands of the industrial process or operators and execute desired segments. However, by reason of using a high-speed memory the cost of the memory is expensive. So it is desirable that the capacity of the main memory 11 C2-5 in the computers $C_2$ to $C_5$ be as small as possible. Only the size of the largest segment to be executed is needed. Accordingly it is necessary that the segment corresponding to a demand be fetched from the bulk memory 35 or 36 into main memory 11C2-5 when a demand from the industrial process or operator occurs. When demands from the industrial process or operator increase, fetch requests to the bulk memory 35 or 36 from each of the computers $C_2$ to $C_5$ increase, and as a result long waiting queues are formed in the multi-access controller 37. With increasing length of the waiting queues, the time delay in fetching a segment and executing it from the time of receiving demands from an industrial process or operator increases, and thereby the time required to respond to the demand becomes greater.

Each of the segments has a number $P(p=0, 1, 2, —B)$. Each of the computers $C_2$ to $C_5$ has a program in which the states of the industrial process or of demands of the operators are scanned at fixed intervals. In the scanning process this program determines the executable segment number in response to changes in the states or demands of the external world. At the same time this program sends this segment number to the schedule master $C_1$ through processor interface modules 28 and 24, 29 and 25, 30 and 36, or 31 and 27.

The schedule master C1 has a segment-state-table (hereinafter called SST) containing the states of each segment, i.e. the following states:

(1) whether demand for execution exists or not.
(2) scheduled execution-time.
(3) current location of the segment.
(4) whether segments are executing, suspending or execution completed.

The computers $C_2$ to $C_5$ report the current state of the executing segment (one of the four states) to the schedule master $C_1$ via the processor interface modules 28 and 24, 29 and 25, 30 and 26 or 31 and 27. The schedule master $C_1$ writes the received state information in the SST.

For convenience of illustration, it has been described above that the data transfer is effected from the processor interface module 24 to the processor interface module 28 in FIG. 2, however the data transferring direction may be reversed in accordance with the status of the processor interface module having a data transferring motive.

It can be understood that the data transfer can similarly be effected between the other processor interface modules 25 and 29, 26 and 30 and 27 and 31. In this way data transfer is effected between the schedule master $C_1$ and other computers $C_2$ through $C_5$.

The representative specifications of the processor interface modules are as follows:
 data transfer: 16 bits parallel
 transfer speed: max 500 KB/sec
 transfer distance: 20 m
 transfer error detection: parity check.

Optimum arrangements of the multi-computer system may differ in accordance with the system to which the multi-computer system is applied, so that it is preferably that the components of the multi-computer system be divided into modules which are in turn selectively and easily combined with each other to form various systems. However in every case, it is required to provide the schedule master $C_1$ of FIG. 2, and the following functions of the same are necessary therefor.

To provide for system reformation upon the failure of any one of computers $C_2$ to $C_5$, the schedule master $C_1$ has to be made so as to be able to track the process statuses of each computers $C_2$ to $C_5$. In addition, when a failure has occurred in any one of computers $C_2$ to $C_5$, the schedule master $C_1$ has to reform the system by analyzing the failure. For the further provision of a failure in the schedule master itself, the schedule master $C_1$ stores the statuses and data of the other computers $C_2$ to $C_5$ in itself, and also provides a duplicate copy of this data to the bulk memory devices 35 and 36 of FIG. 2.

The above described functions can be achieved by adding the required processes into the operating system in the schedule master $C_1$. It is possible to make modules by standardizing several of the processes to be added.

The invention features the fact that the schedule master $C_1$ is employed as a buffer memory. In this way, a program or data segment which is the most time critical within the processes to be alloted for each of the computers $C_2$ to $C_5$ is preloaded into the schedule master $C_1$, so that when a computer effects the process, the segment can be loaded from the schedule master $C_1$ into the computer without transferring it from the bulk memory devices 35 and 36. The above-described data transfer from the schedule master C₁ is effected with a high speed to significantly reduce the response time in the industrial process control.

Schedule master C₁ decides the location of the specific segments. For instance, in a process which is particularly time critical, its program or data segment cannot be recalled from the buffer memory in time for the industrial process control. Accordingly such a segment is not taken out of the main memory of the schedule master. However, in a process which is not time critical, the segment which is referred to can be loaded into the main memory of one of computers $C_2$ to $C_5$ directly from the bulk memory device 35 and 36. It is required to alter the location at which the segments are present in accordance with the load on the computer system.

Figure 4:
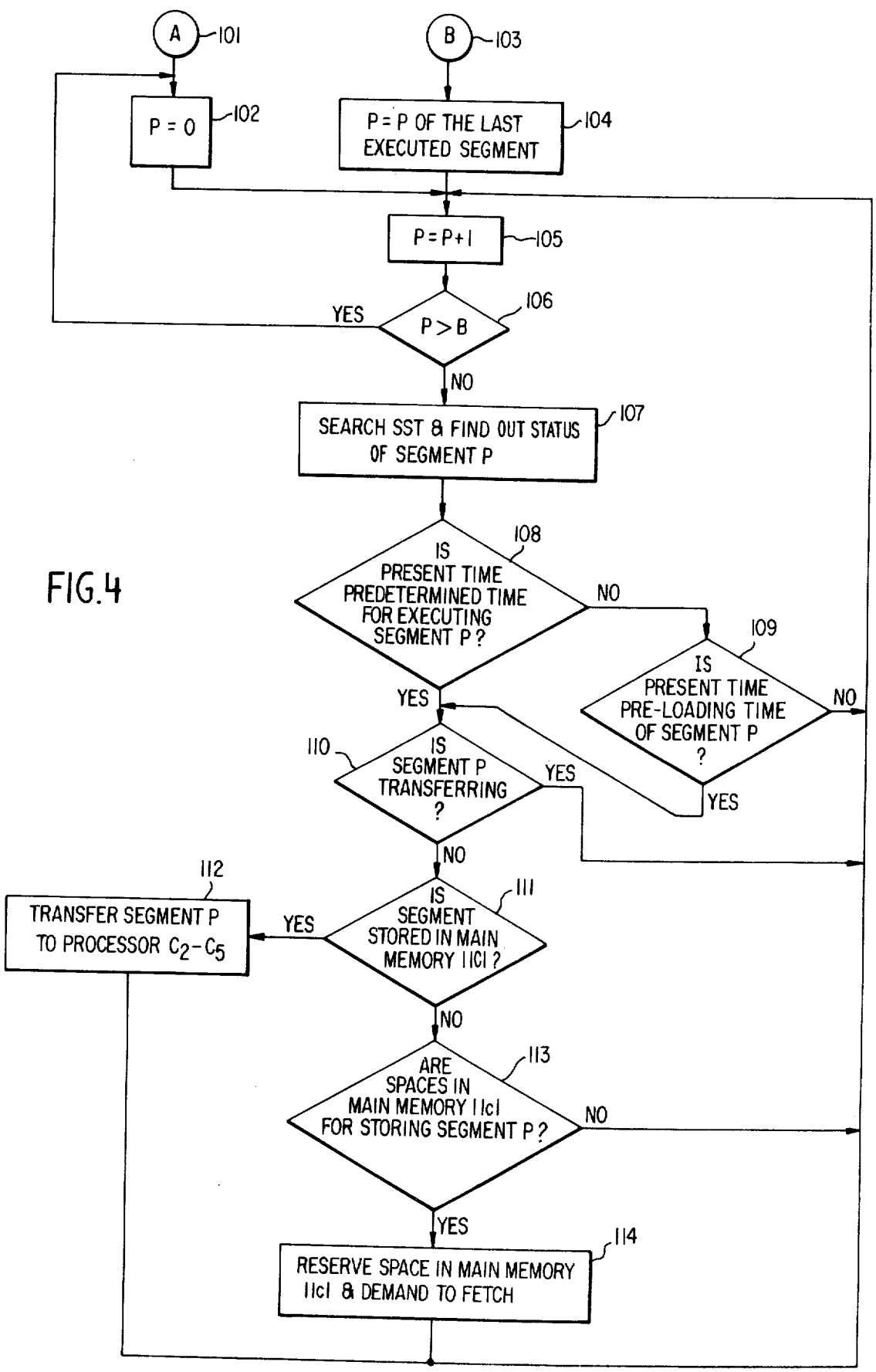
FIG. 4 is a flow chart for the pre-loading function executed by the schedule master $C_1$.

Referring to FIG. 4, the operation of the flow chart relating to the pre-loading function executed by the schedule master C1 is as follows. Item P represents an internal variable Box 101: This entry is entered when the interrupt by the system timer occurs or the transferring of information of the bulk memory is completed.

Box 102: This is an action to make P equal to zero. The indication "P=0" means that P is the highest priority level.

Box 103: This entry is entered when termination, delay or suspension of the task occurs.

Box 104: This is an action to make P the priority level of the last executed process.

Box 105: P is counted up.

Box 106: A decision box for determining whether P is larger than the total number of the processes B.

Box 107: This is an action to search the SST and find out the status of segment P.

Box 108: A decision box for determining whether the present time is the predetermined time for executing the segment P.

Box 109: A decision box for determining whether the present time is the pre-loading time of the segment P.

Box 110: A decision box for determining whether the segments are transferred.

Box 111: A decision box for determining whether the segments are stored in the main memory 11C1.

Box 112: Segment P is transferred to the processors $C_2$ to $C_5$.

Box 113: A decision box for determining whether there are spaces of the main memory 11C1 for storing the segment P.

Box 114: This is an action to reserve the spaces of the main memory 11C1 and to store the segments in the transferring queue.

Information stored in the bulk memory devices 35 and/or 36 is preloaded into the main memory 11C1 of the schedule master C1 through the multi-access controller 37 at the time preceding the time α to time T at which the invocation from the industrial process occurs.

At the time T, the processors 12C2 and 12C5 can be executed provided that the desired information is readily transferred from the main memory 11C1 of the schedule master to the main memory 11C2 or 11C5 through the corresponding processor interface modules 24–28, 25–29, 26–30 or 27–31.

After the program is executed, the information of the main memories 11C1 to 11C5 of the above-mentioned program is cleared, but there is no clearance when the interval between successive invocations is less than the time.

The time α depends on the length of the waiting queue to the multi-access controller 37 and is calculated by the schedule master with the measured length of the waiting queue.

A fetch algorithm for forecasting the time α is as follows.

Segments which are referred by the time-marginal demands are loaded from bulk memory directly to the memories 11C2–11C5 at the moment when demands happen. For the time-critical demands, segments are fetched to the memory 11C₁ of the schedule-master C1 previously to their invocations.

In order to enable this pre-fetch or preloading, the following prediction (on line) calculations are to be executed in the schedule master C1.

(1) Predicting the moment when the activity is invoked:

In the j-th invocation of a segment, it is defined by z(j) where $z(j) = t(j) - t(j-1)$, and t(j) is the clock time when the j-th invocation occurred. It is assumed that the z(j) is not constant and varies in probability. T(j+1) is an average invocation interval before the (j+1)-th invocation.

$$T(j+1) = T(j) + w(j) \quad (1)$$

$$z(j) = T(j) + v(j) \quad (2)$$

where w is disturbance and v is measurement error, and $$E(v_j) = 0, \; E(v_j \cdot v_1) = \gamma \cdot \delta_{j1} \quad (3)$$

$$E(w_j) = 0, \; E(w_j \cdot w_1) = q \cdot \delta_{j1} \quad (4)$$

$$E(T(0)) = \widehat{T}(0), \; E(T(0) - T(0))^2 = P(0)$$

The values with hat ∧ are estimated values, and P(j) is covariance of $\widehat{T}(j)$. $\widehat{T}(0)$ and P(0) are initiallized at the beginnings of the estimation interval. Applying Kalman's method, the optimal predicted clock time of the (j+2)-th invocation, $\widehat{t}(j+2)$, is obtained as follows:

$$\widehat{t}(j+2) = \widehat{t}(j+1) + \widehat{T}(j+1) \quad (5)$$

$$\text{where } \widehat{T}(j+1) = \widehat{T}(j) + P(j+1)[z(j+1) - \widehat{T}(j)]1/\gamma \quad (6)$$

$$1/P(j+1) = (1/r) + 1/[P(j) + q] \quad (7)$$

(2) Predicting the response time of time-critical activity:

When the system is on the k-th sampling stage within the i-th estimation interval, a program measures the average queuing time z(k) (average time that a process stay in a queue), and predicts the response time of an idling process. Response time x consists of $x_1$ and $x_2$. The $x_2$ is the time that the activity is stationed in queues, and $x_1$ is the time that activity is processed on the processors and channels. Assuming that the response time of an activity is x(k), if it should be invoked at the K-th sampling stage within i-th estimation interval, the following transition model will be considered.

$$x(k+1) = x_1(k+1) + x_2(k+1) \quad (8)$$

$$x_2(k+1) = \Phi(k) \cdot x_2(k) + U(i) + \Gamma(k) \cdot \Delta(k) \quad (9)$$

$$z(k) = H(k) \cdot x_2(k) + v(k) \quad (10)$$

where x(k): Response times of n activities, n-vector $u(i)$: sustained changes of $x(k)$ within $i$-th estimation interval, $n$-vector $\Delta(k)$: fringed changed of $x(k)$ within same interval, $n$-vector $z(k)$: measured values of average queuing times at $m$ queues, $m$-vector $\Phi(k)$: transition function, $n \cdot n$ matrix $H(k)$: Jacobian matrix, $m \cdot n$ matrix $P(k)$: sensitivity matrix, $n \cdot n$ matrix $v(k)$: measurement errors, $m$-vector $$E[\Delta(k)] = 0, \; E[\Delta(K) \cdot \Delta^T(K)] = Q(k) \tag{11}$$

$$Q(k) = \text{diag.} [\alpha_i \cdot \gamma_i^2 (\Delta^i)^2] \tag{12}$$

where $\gamma$ is the maximum rate of change (fringed) of $x(k)$, and $\alpha$ is the modificating value.

$$E[v(k) \cdot v^T(k)] = R(k), \; E[v(k)] = 0 \tag{13}$$

Using Kalman's method, the optimally predicted value of $x(k+1)$ will be obtained.

expected value:
$$\bar{x}_2(k) \longrightarrow \bar{x}_2(k+1) \longrightarrow \bar{\bar{x}}_2(k+1)$$
$$\begin{array}{cc} \overline{\Delta(k)}\uparrow & z(k+1)\uparrow \\ \theta(k)\downarrow & R(k+1)\downarrow \end{array}$$

covariance:
$$P(k) \longrightarrow M(k+1) \longrightarrow P(k+1)$$
$k$-th interval $\longleftrightarrow (k+1)$-th interval $$\hat{x}2(k+1) = X_2(k+1) + K(k+1)[z(k+1) - H(k+1) \cdot x_2(k+1)] \tag{14}$$

where, $x_2(k+1) = \Phi(k) \cdot \hat{x}_2(k) + \Gamma(k) \cdot \Delta(k) + u(i)$ (15)

$$K(k+1) = P(k+1) \cdot H^T(k+1) \cdot R^{-1}(k+1) \tag{16}$$

$$P(k+1) = [M^{-1}(k+1) + H^T(k+1) \cdot R^{-1}(k+1) \cdot H(k+1)]^{-1} \tag{17}$$

$$M(k+1) = \Phi(k) \cdot P(k) \cdot \Phi^T(k) + \Gamma(k) \cdot Q(k) \cdot \Gamma^T(k) \tag{18}$$

$\hat{x}(0)$, $P(0)$ are set at the beginning of estimation interval. The $x$, $u$ and $\Delta$ are $n$-vector and $z$ and $v$ are $m$-vector. Most of the calculations are made in off-line, by tracking $x_2$ on the nominal path.

(3) Deciding fetch-time:

The Predicated fetch-time $\hat{t}_f(j+2)$ of the segment on the $(j+2)$-th activation is obtained by following equation.

$$\hat{t}_f(j+2) = \hat{t}(j+2) \cdot [\hat{x}(k+1) - LT] \tag{19}$$

where $LT$ is the given limit response time to the activity. This calculation is made once for a sampling interval per an activity, and if present time $\geq \hat{t}_f$ pre-loading of the segment of the said activity is initialized, otherwise nothing is done.

Now a replacement algorithm for establishing the above-mentioned is stated.

Each block in the memory space has swappable - unswappable bit (hereinafter called S bit). S bits of segment are modified to new values when the execution of the segment is completed. When the condition of $\hat{T}(j+1) < \hat{x} (j+2)$ exists for the next invocation of the said segment, this segment will not be swappable from the memory 11c1.

In this case, the system will set the S-bit as unswappable. Otherwise the S bit is set to be swappable for every blocks of memory spaces occupied by the segment. When the system needs new blocks for a new, S-bits are scanned and the owners of swappable locks are swapped out.

A table 1 shows an example of the program in one computer, the so-called requesting computer, having a transfer request to another computer, the so called requested computer. In the table 1, a first word of four figures from the left side represents a memory address indicated in hexa-decimal notation, and the next word of eight figures represents a command and data which is stored in the memory address and is indicated in hexa-decimal notation.

The next word of six figures is a pseudo-code by the assembler indicating the memory address. The next word of two, three or four figures represents a command-code according to the rule of assembler. The next word represents an operand for using the command code. The remaining word is a comment.

Now, at the 6634 memory address, a 1 is stored in the two right-most bits in REQ address (hexa-decimal). At the 6636 memory address the command-word is made. the content which is stored in the command address is used as the command word. Accordingly, the command-word at the 6636 memory address becomes as follows:

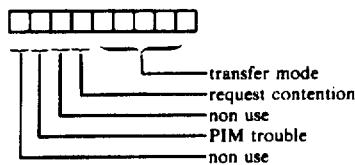

The two left-most bits stored at the 6636 memory address correspond to the two right-most bits stored. These mean that REQUEST is the third classification. The third classification represents that it is desirous to execute the transfer control word (IECB) in 16 byte.

At the 663A memory address, the number 16 is stored in the memory address called TSIZ for storing the transfer word length. At the 663E and 6642 memory addresses, the command executing the interruption disable is stored.

This program has a table which stores the operating status of the PIM separately. The byte stored in the fourth byte from the top address PUCB of the table is as follows.

```
┌─┬─┬─┬─┬─┬─┬─┬─┐
└─┴─┴─┴─┴─┴─┴─┴─┘
      │ │ │ │ └── transfer mode
      │ │ │ └──── request contention
      │ │ └────── non use
      │ └──────── PIM trouble
      └────────── non use
```

At the 6644 memory address, its byte is loaded in PVCB memory address, and at the 6648 memory address, it is checked whether a "1" exists or not in this byte.

"1" is left in the byte when the request contention exists and/or when the PIM does not finish all processing of the other request. In such case, the program jumps to the 6658 memory address.

At the 664E memory address, the sixth byte in the operating status table of the PIM is loaded to the LIECB when the PIM does not enter such state. In the sixth byte the IECB, i.e. address of location to be stored the transfer control word has been stored.

At the 6652 memory address, it is checked whether the status of the hardware of the PIM is "busy". If the status if "busy", the program is transferred to the 6658 memory address and the content of the LIECB is stored in a queue LST. If the status is "not busy", the content which is that the request is the third classification is set to the position of the transfer mode of the fourth byte, i.e. 4(PVCB) in the table of the PIM operating status. At the 6664 memory address the PIM is cleared, and at the 6668 memory address the top address of a transferring word is set. At the 666A memory address a transfer size is set and at the 666C memory address an output command is executed.

This means that by the above-mentioned, the request for transferring the transferring control word to the requested computer was placed. At the 666E memory address an interruption is permitted.

At the memory addresses from 5880 to 5580, the content in the STATUS location is checked for whether the request is of third, second, or first classification:

third classification:
the request in the case in which 16 byte information for controlling and n-byte data continuing it are transferred.

second classification:
the response that the memory space for the transferring data in the requested computer does not exist in full.

first classification:
the request only for transferring 16 byte informa-

TABLE 1

| Memory Address | Command & Data | Pseudo Code | Command Code | Operand | Comment |
|---|---|---|---|---|---|
| 6634 | | PTF020 | EQU | * | |
| 6634 | 24D3 | | LIS | REQ,3 | MODE IS 3 |
| 6636 | C850 | 00C0 | LHI | CMND,X'C0' | SET COMMAND |
| 663A | | | EQU | * | |
| 663A | | PTF030 | | | |
| 663A | C840 | 0010 | LHI | TSIZ,16 | SET TRANSFER SIZE |
| 663E | C8C0 | 3400 | LHI | Temp,1A12 | |
| 6642 | 95EC | | EPSR | SPSW,TEMP | INHIBIT INTERRUPTION |
| 6644 | D388 | 0004 | LB | PUCB4,4(PUCB) | |
| 6648 | C3B0 | 001F | THI | PUCB4,X'IF' | CHECK FOR BUSY |
| 664C | 2136 | 001F | BNZS | PTF035 | BUSY |
| 664E | 4068 | 0006 | STH | LIECB,6(PUCB) | SET IECB ADDRESS TO UCB |
| 6652 | 9D9C | | SSR | DEV,TEMP | READ STATUS |
| 6654 | 43F0 | 665E | BFC | X'F', PTF036 | NOT BUSY |
| 6658 | | | PTF035 | EQU | * |
| 6658 | 646A | 0000 | STL | LIECB,0(LST) | RESTORE TO QUEUE |
| 665C | 2309 | | BS | PTF040 | |
| 665E | | PTF036 | EQU | * | |
| 665E | 06BD | | OHR | PUCB4,REQ | |
| 6660 | D2B8 | 0004 | STB | PUCB4,4(PUCB) | SET TRANSFER MODE TO UCB |
| 6664 | DE90 | 66A6 | OC | DEV,CLR | |
| 6668 | 9896 | | WHR | DEV,LIECB | SET START ADDRESS |
| 666A | 9894 | | WHR | DEV,TSIZ | SET TRANSFER SIZE |
| 666C | 9E95 | | OCR | DEV,CMND | OUTPUT COMMAND |
| 666E | | PTF040 | EQU | * | |
| 666E | 95CE | | EPSR | TEMP, SPSW | PERMIT INTERRUPTION |

An operation of the requested computer is stated in connection with a table 2. REQ1 and REQ2 bits of the command flip-flop in the PIM of the requesting computer are connected with RQT1 and RQT2 bits of the status flip-flop in the PIM of the requested computer.

That is to say, the request classification from the requesting computer is communicated to the requested computer by the RQT1 and RQT2 bits.

The contents of the command flip-flop in the PIM of the requesting computer and of the status flip-flop in the PIM of the requested computer are as follows.

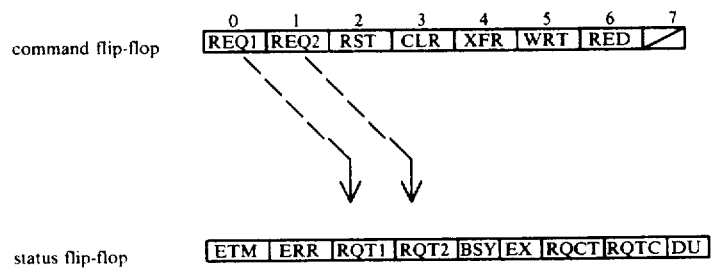

As the requesting computer executes the request command, it is communicated to an automatic interruption in the requested computer through the attention-/acknowledge in the PIM of the requested computer. When the interruption is communicated to the requested computer, the processing program of the interruption transfers the content of the status flip-flop to a location designated STATUS.

tion for controlling.

If the request is the third classification, the program jumps to the 5894 memory address. Here, a word representing that the transfer request is the third classification, is made and it is stored in TEMP address, and further it is stored in the location of the fourth byte from the top address PUCB of the table of the PIM operating status at the 5896 memory address. At the 5898 and 589A memory addresses, a number and a figure of an empty block of the main memory are respectively set in BFNO and NOBK, and they are reserved by a supervisor-call (SVC) at the 589C memory address.

When a space to be reserved does not exist, at the 58A2 and 58A6 memory addresses the request of the second classification is sent to the request computer and the request is stopped.

When the space exists, at the memory addresses from 58AE to 5888 the transfer size and the transfer address are set. At the 58BC and 58BE memory addresses, the last byte of the IECB is set at zero and at the 58C2 memory address the command word is made.

At memory addresses from 58FE to 5902 the transfer size and the transfer start address are set in the PJM and the transfer is started.

PIM 24 to the processor 12 of the schedule master C1.

Figure 6:
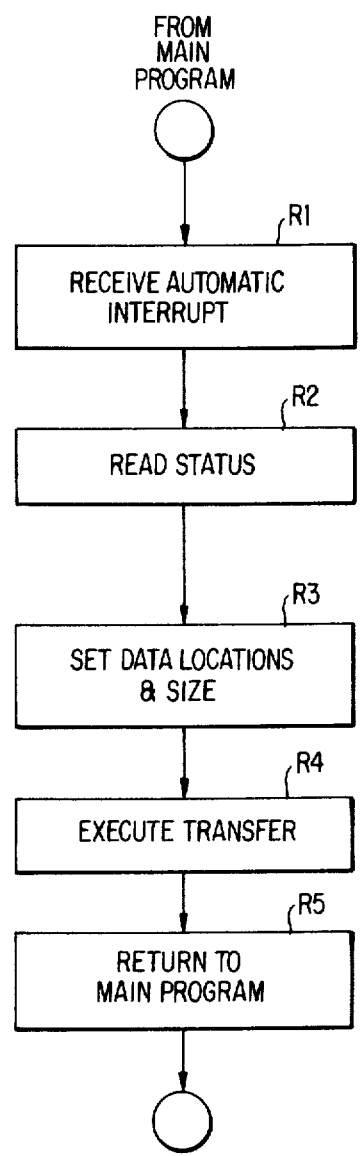
FIG. 6 is a flow chart of the transferring execution in the requested computer.

A flow chart of the executions in the requested computer shown in FIG. 6 is as follows. Box R1 is entered from main program.

TABLE 2

| Memory Address | Command & Data | | Pseudo Code | Command Code | operand | Comment |
|---|---|---|---|---|---|---|
|  |  |  |  |  | REQUEST FROM OPPOSITE CPU |  |
| 5880 |  |  | PDR100 | EQU | * |  |
| 5880 | C500 | 0003 |  | CLHI | STATUS,3 |  |
| 5884 | 4330 | 5894 |  | BE | PDR110 | REQUEST MODE-IS 3 |
| 588B | C500 | 0001 |  | CLHI | STATUS,1 |  |
| 588C | 4330 | 05F8 |  | BE | NEXT Q | REQUEST MODE IS 2 |
| 5890 | 24C9 |  |  | LIS | TEMP,9 | REQUREST 1, RECEIVING SIDE |
| 5892 | 2302 |  |  | BS | PDR120 |  |
| 5894 |  |  | PDR110 | EQU | * |  |
| 5894 | 24CB |  |  | LIS | TEMP,11 | REQUEST 3, RECEIVING SIDE, 1ST TIME |
| 5896 |  |  | PDR120 | EQU | * |  |
| 5896 | 06BC |  |  | OHR | PUCB4, TEMP | SET TRANSFER MODE |
| 5898 | 2411 |  |  | LIS | BFNO,NOBIEC | SET BUFFER NO, OF IECB |
| 589A | 2421 |  |  | LIS | NOBK,1 | SET NO. OF BLOCK |
| 589C | E130 | 0006 |  | SVC | SUB,RSVBF1 | RESERVE IECB |
| 58A0 | 2387 |  |  | BNCS | PDR140 |  |
| 58A2 |  |  | PDR130 | EQU | * | NOT RESERVED, NOTICE OPPOSITE CPU |
| 58A2 | DE90 | 5A72 |  | OC | DEV,REQ2 | OUTPUT REQUEST 2 COMMAND |
| 58A6 | C680 | 002 |  | OHI | PUCB4,2 | SET TRANSFER MODE |
| 58AA | 4300 | 5976 |  | B | PDR258 |  |
| 58AE |  |  | PDR140 | EQU | * |  |
| 58AE | C840 | 0010 |  | LHI | SIZE,16 | SET TRANSFER SIZE |
| 5882 | 9134 |  |  | SLCS | ADRS,4 | MULTIPLY BY 16 (RVBN=ADRS) |
| 5884 | CA30 | CC00 |  | AHI | ADRS,IECRUF | GET IECB ADDRESS |
| 5888 | 4038 | 0006 |  | STH | ADRS,6(PUCB) | SET IECB ADDRESS TO UCB |
| 588C | 24C0 |  |  | LIS | TEMP,0 |  |
| 588E | D2C3 | 000F |  | STB | TEMP,15(ADRS) | CLEAR LAST BYTE OF IECB |
| 58C2 | 245A |  |  | LIS | CMND,X'A' | SET READ COMMAND |
| 58C4 | 4300 | 58FE |  | B | PDR160 |  |
| 58FE |  |  | PDR160 | EQU | * |  |
| 58FE | 9893 |  |  | WHR | DEV,ADRS | SET START ADDRESS |
| 5900 | 9894 |  |  | WHR | DEV,SIZE | SET TRANSFER SIZE |
| 5902 | 9E95 |  |  | OCR | DEV,CMND | OUTPUT COMMAND |
| 5904 | 4300 | 5878 |  | B | PDR020 |  |

Figure 5:
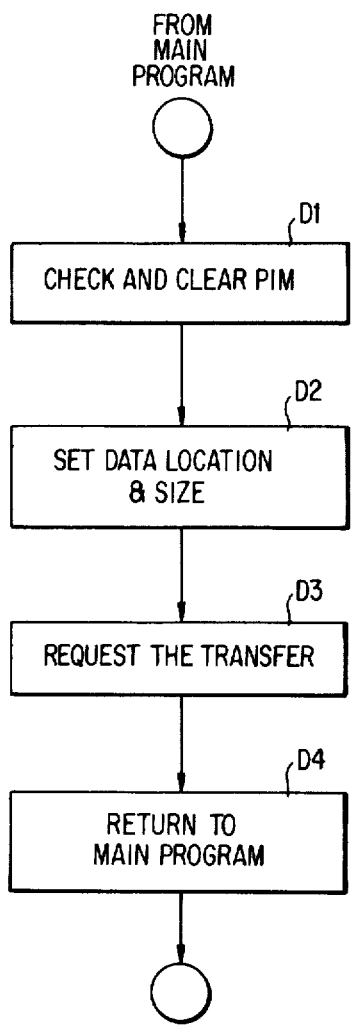
FIG. 5 is a flow chart of the transferring execution in the requesting computer.

The transfer of data between two computers is set forth by the procedure as is explained in a flow chart of FIGS. 5 and 6. Two flow charts, one of which is for the computer having the request of transfers and the other for the computer responding, are described.

A flow chart of the executions in the requesting computer shown in FIG. 5 is as follows:

Box D1 is entered from any program in which programmers want to communicate data with the other computer.

Box D1: The instruction to check the PIM status is executed. If the status is ready for transfers, the procedure to initialize the PIM by the CLEAR instruction is executed.

Box D2: Let us suppose that the data to be received or to be sent are placed or to be placed in the memory locations whose addresses are from P1 through to Pn (n=1, 2—). By the "WRITE DATA" instruction, P1 is placed in the address counter 44 and "n" is placed in the word counter 46, through input-output bus 14 from the processor 12.

Box D3: The "REQUEST" instruction to generate the request of transfer to the other computer, such as computer C2 is executed through command flip-flop 51. By this instruction, the direction of the flow of data, i.e., whether the data is to flow from the requesting computer to the requested computer or otherwise, is also defined.

Box D4: Return to the main program. If the data is to be received, the main program is processed through the word counter 46 and the interface control 53 of the Box R1: The automatic interruption caused by the "REQUEST" instruction at the requesting computer is received.

Box R2: The content of the status flip-flop 52 is read and it is checked whether the request is the flow of data from the requesting computer to the requested computer or otherwise.

Box R3: This procedure is the same with Box D2.

Box R4: The "EXECUTE" instruction to start the transfer is executed through the command flip-flop 51. By this instruction, the direction of the flow of data from the requesting computer to the requested computer or otherwise is defined.

Box R5: This procedure is the same with Box D4.

Now, the interface control 53 in PIM is explained in connection with FIGS. 7 to 9.

The transfer of data takes place when one computer makes "REQUEST" for transferring data from the opposite computer or "REQUEST" for transferring data to the opposite computer, and the opposite computer generates the "EXECUTE" command on "XFR" command.

By executing the "XFR" command in the opposite PIM, the XFROL signal in the opposite PIM is raised to set PXFRM flip-flops in both PIMs. In both PIMs, PXFRM flip-flops of the command flip-flops 51 is set and XFRM flip-flops generates STATO signal which starts the transfer of data.

The logic flow chart shows the logic control sequence of the interface control 53 in PIM. Before reading the flow chart in FIGS. 7A and B, the following explanation will be offered to help in its understanding.

Assuming that the requesting PIM is in the "READ" mode, when this PIM is ready for receiving the data, it sets the SDAR flip-flop and sends a DAROL signal to the partner PIM. This signal designated the DARIL signal is received by the partner PIM and sets the RCDAR flip-flop. When the sending data of the partner computer is ready for the transfer, the partner PIM sets the SDAR flip-flop and sends back the DAROL signal to the first PIM by the XFR command.

In case the requesting PIM is in the "WRITE" mode and this PIM is ready for sending the data, it sets the SDAR flip-flop. The following procedures are the same as above. The clock A sends a pulse every 4 micro seconds on which timing a byte is transferred. At the clock A's timing, DAROL signal is sent to the receiving PIM with the data in the buffer register 48.

When the DAROL signal is received by the receiving PIM, the DARIL signal sets the RCDAR flip-flop. The received data is error-checked, after which it is transferred to MDR register 45 to be placed in the memory.

When the end of transfer or the transfer-error is found, the END flip-flop is set. The ENDOL signal to the partner PIM to set the partner END flip-flop is generated.

The PIM including the set END flip-flop is in the "ready" state and causes an automatic interruption to the computer to inform of the transfer-completion.

Figure 7A:
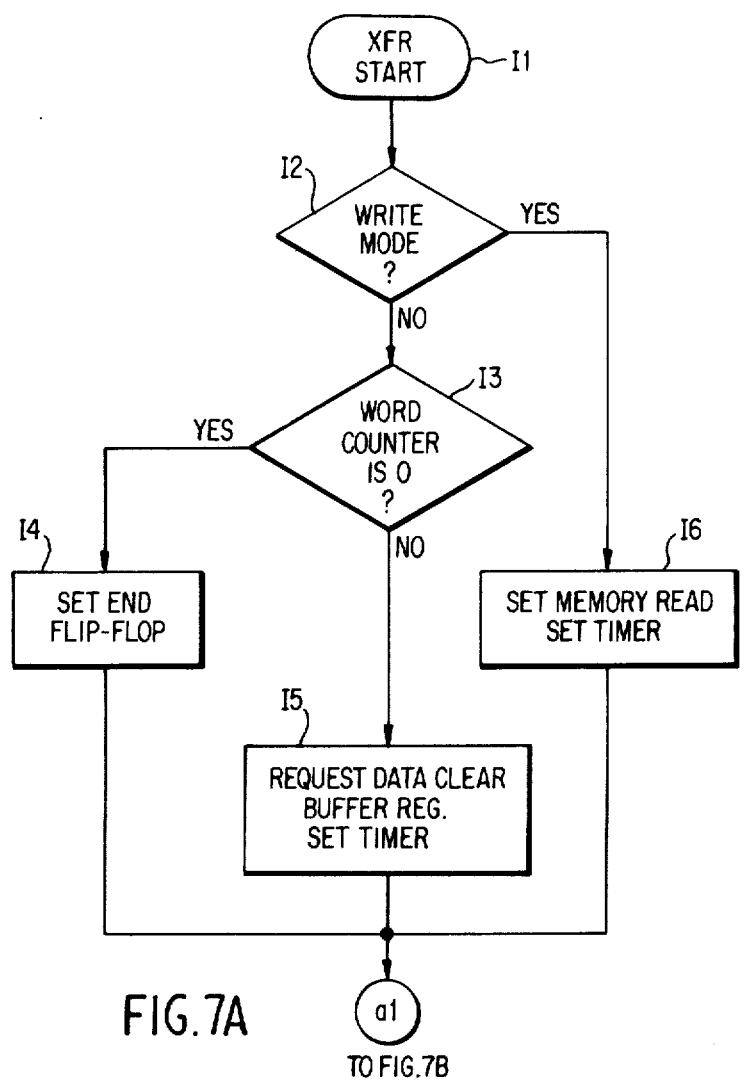
FIGS. 7A and 7B are a flow chart for the transferring function executed by the interface control 53 in PIM 24 shown in FIG. 3.
Figure 7B:
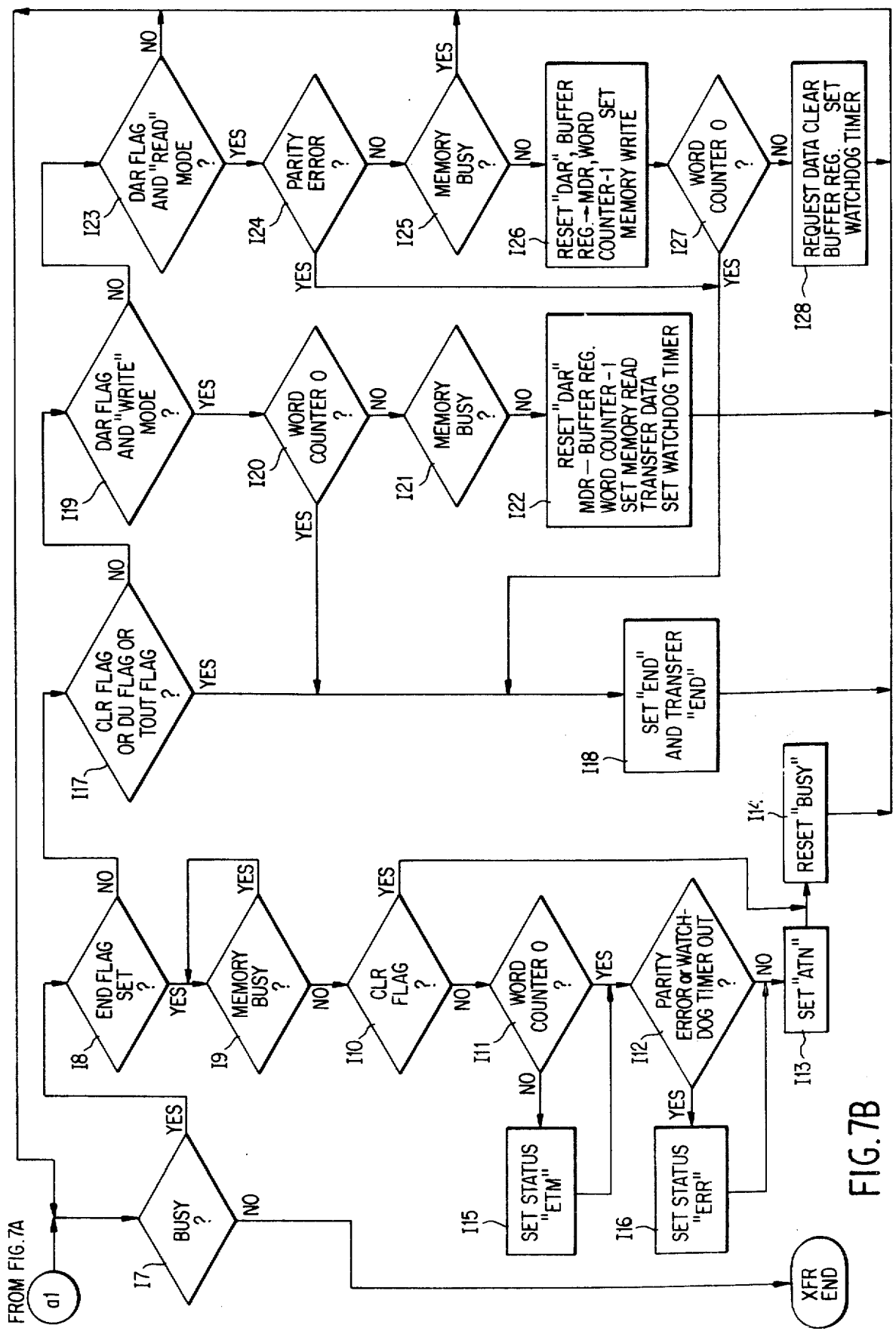

So, the logic flow chart of the interface control 53 shown in FIGS 7A and 7B is stated with respect to the box.

Box I1 means that the PIM is in the transfer-start status. When the PIM is in the "READ" mode, the content of the word counter 46 is checked at Box I3. If it has a number more than zero, it prepares the transfer at Box I5, otherwise it sets END flip-flop (Box I4).

In the "WRITE" mode, it prepares for the memory-read at Box I6. In the state at Boxes I5 and I6, the PIM is in the busy state. A DAR flag is set at the fixed interval as long as the transfer condition is established. In the normal "WRITE" operation, Boxes I19, I20, I21, and I22 are executed. In the normal "READ" operation, Boxes I23, I24, I25, I26, I27 and I28 are executed.

In Box I18, the END flip-flop is set. Box I8 through to Box I16 are the routines for the operations to terminate the activity of PIM. When the END flip-flop is set, the PIM terminates the transfer and is ready for the next transfer. At this moment, the PIM interrupts the processor to receive the next command.

Figure 8A:
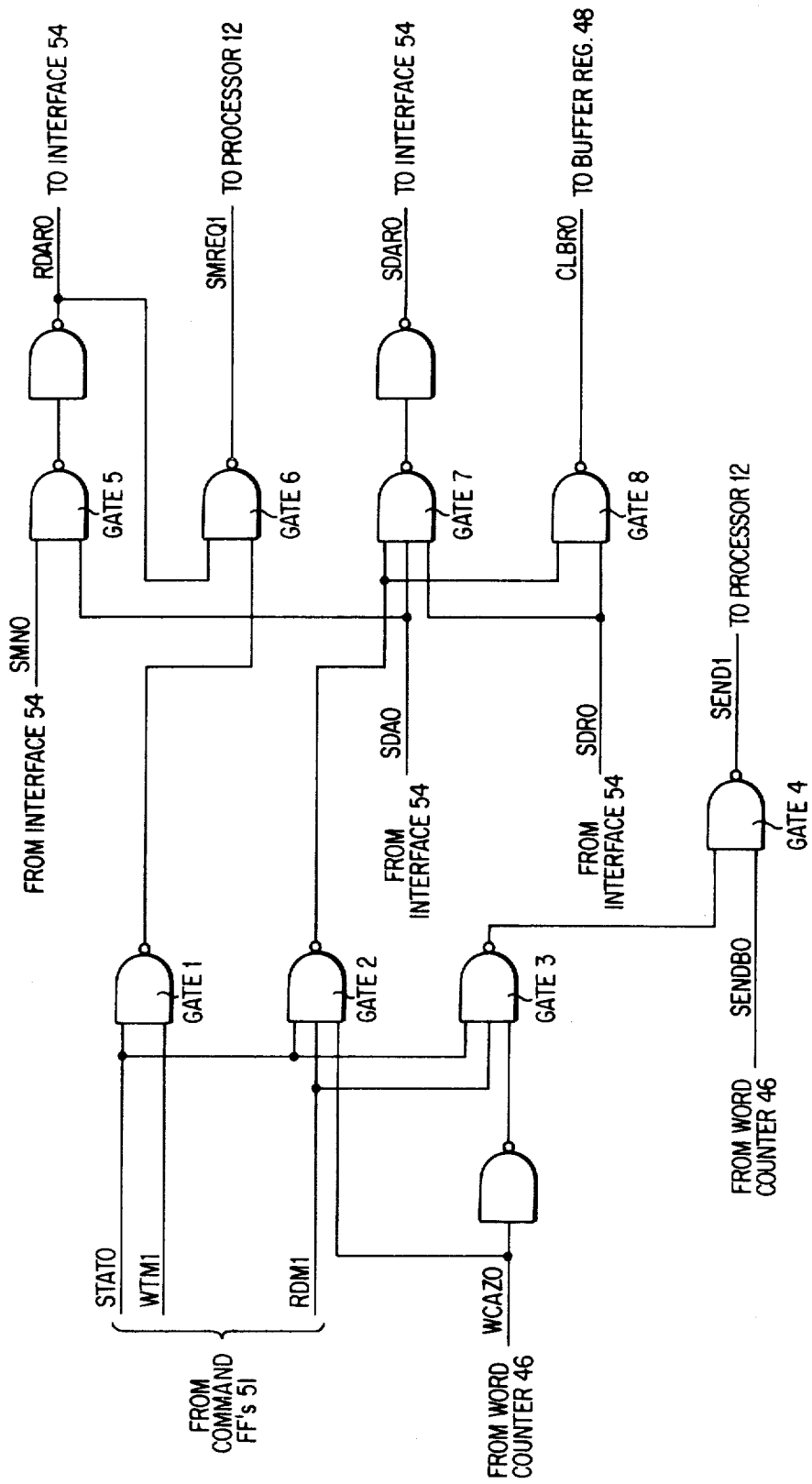
FIGS. 8A and 8B are a logic diagram of the interface control 53.
Figure 8B:
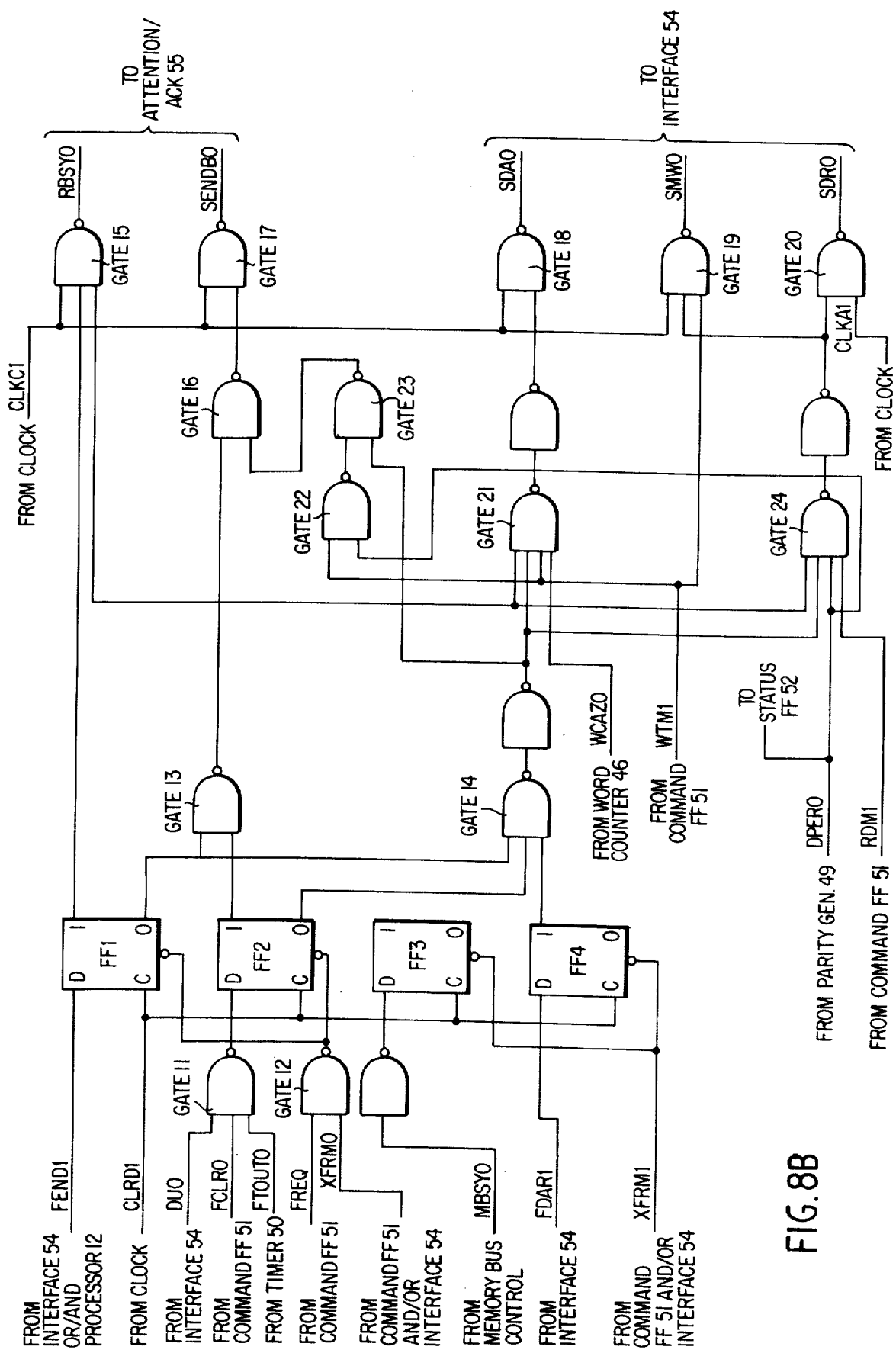

FIGS. 8A and 8B are the logic diagram of one example for the interface control 53. The logic diagram is explained hereinafter.

At the "WRITE" mode, STATO and WTM1 signals which cause SMREQ 1 signal to set the memory request through gates 1 and 6 to the processor 12 are set. At the "READ" mode, STATO and RDM1 signals are set. If the content of the word counter 46 is not zero, WCAZO signal is set. Taking the AND logic of those three signals at gate 7, the PIM sends a "DATA REQUEST" signal to the opposite PIM by SDARO signal and clears the buffer register 48 by CLBRO signal, through gates 7 and 8.

If the content of the word counter 46 is zero, an inverted WCAZO signal generates a SEND1 signal to set END flip-flop and sends an INDOL signal to the opposite PIM.

The above explanations of the logic diagram correspond to the Box I1 through to the Box I6 of the flow chart shown in FIG. 7A.

Next explanations of the logic diagram corresponding to the Box I8 through to the Box I14 of the flow chart are shown in FIG. 7B. In case the memory access is completed and the END flag is set, the MBSYO signal is set and the RBSYO signal to be communicated to the attention/acknowledge 55 is generated through flip-flop 3 and gate 15 to reset the XFRM flip-flop and set the status flip-flop and the attention flip-flop in case the CLR flip-flop is not set.

Next, the logic diagram corresponding to the Box I17 and I18 of the flow chart will be explained.

A gate 11 takes the OR-logic of the FCLRO signal from the command flip-flop 51 (CLR flip-flop is set), DUO signal (device unavailable) from the interface 54, and FTOUTO (watch-dog time is out) from the timer 50 and SENDBO signal is generated to set END flip-flop and to send END signal to the opposite PIM, through the flip-flop 2 gates 13, 16 and 17.

Next the logic diagram corresponding to the Boxes I19, I20, I21 and I22 of the flow chart will be explained.

At the moment that the opposite PIM is ready, a FDAR1 signal is raised. A gate 14 takes the AND-logic of the flip-flop 1 output, flip-flop 2 output and flip-flop 4 output. A gate 15 takes the AND-logic of an output of a gate 14. WCAZO (the content of the word counter 46 is not zero) signal and WTM1 ("WRITE" mode) signal.

If the memory is not busy, SDAO signal is generated through a gate 18 to make the action described in the Box I22 of the flow chart shown in FIG. 7B. The functions in the Box I22 are implemented by the gates 16 and 17.

Next the logic diagram corresponding to the Box I23 through to the Box I28 of the flow chart shown in FIG. 7B will be explained. A gate 19 takes the AND logic of output of the flip-flop 3, output of a gate 14, DPERO (no parity error) signal and RDM1 ("READ" mode) signal. and it generates SMWO signal to do the functions described in the Box I26.

If a parity error exists, a SENDBO signal is raised through a gate 22 to do the function described in the Box I26.

If a parity error exists, a SENDBO signal is raised through a gate 22 to do the function described in the Box I18.

In the circuit shown in FIGS. 8A and 8B, there are four kinds of clock signal which are CLKAI, CLKBI, CLKCI and CLKD1.

Figure 9:
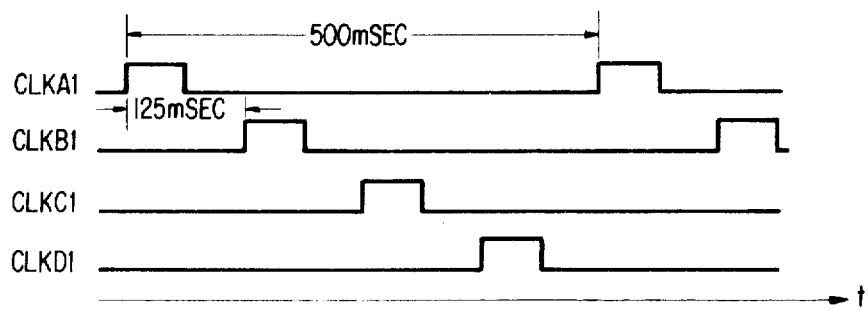
FIG. 9 is a timing chart showing the relation of each of the clocks.

The timing chart in FIG. 9 shows the relations of each of the clocks.

From the above, in accordance with the multi-computer system of the invention, a data segment of a process which is time critical is preloaded into the main memory 11C1 of schedule master $C_1$ to immediately transfer the segment into the main memory of any one of computers $C_2$ to $C_5$ which has received an invocation from the industrial process, so that the response time of the industrial process control is reduced. In addition, in accordance with the system in FIG. 2, if the computers $C_2$ and $C_4$ should fail, the computers $C_3$ and $C_5$ can alternately perform the important functions of the failed computers $C_2$ and $C_4$ without omitting any of the features of this invention. Consequently the invention provides a multi-computer system of high reliability and a quick response for industrial process control.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A multi-computer system for control of an industrial process comprising:
   a plurality of interconnected computers each located at a position capable of access to a portion of said industrial process,
   at least one bulk memory device coupled to at least one of said computers,
   a multi-access controller coupled to said bulk memory device for allowing access by said computers to said bulk memory device,
   said one of computers operating as a schedule master to the others and functioning to transfer data preloaded to said schedule master from storage in said bulk memory into any of said other computers in response to an invocation coming from said industrial process, said preloading of the data into said schedule master computer being performed at a time before the time at which said invocation occurs, said advanced time being varied in accordance with the load on said multi-computer system,
   a programmable peripheral switch coupled between at least two of said computers other than said schedule master computer; and,
   an input-output device selectively connected to one of said computers through said programmable peripheral switch,
   whereby upon failure of any of said computers important functions of the failed computer are transferred to another computer by switchcover of said programmable peripheral switch.

2. A multi-computer system according to claim 1, wherein:
   said schedule master computer normally stores the statuses of said other computers and also transmits the same data to said bulk memory device forstorage as a protection against failure of said schedule master.

3. A multi-computer system according to claim 1, wherein:
   said multi-access controller is formed such that each of said computers is able to effect input and output of a data file independently of the presence of said other computers.

4. A multi-computer system according to claim 1, wherein:
   said schedule master computer normally operates to track the process statuses of said other computers for permitting reformation of the system upon failure of one or more components thereof.

5. A multi-computer system according to claim 1, wherein:
   said schedule master computer effects system reformation by analysing failures within the system.

6. A multi-computer system for control of an industrial process comprising:
   a plurality of interconnected computers, each located at a position capable of access to a portion of the industrial process;
   at least one bulk memory device coupled to at least one of the computers; and,
   a multi-access controller coupled to the bulk memory device for allowing access by the computers to the bulk memory device;
   said one of the computers operating as a schedule master to the others; said schedule master comprising
   means for predicting a next arrival time from statistics of requesting arrival time in each of the computers;
   means for measuring a waiting queue in the multi-access controller;
   means for calculating a time, which is preloaded into the schedule master from the bulk memory in advance, from the predicted next arrival time and the waiting queue; and
   means for fetching the requested programs and data from the schedule master to the requested computer when the invocation in the requested computer occurs.

7. A multi-computer system according to claim 6, wherein:
   said schedule master computer normally stores the statuses of said other computers and also transmits the same data to said bulk memory device for storage as a protection against failure of said schedule master.

8. A multi-computer system according to claim 6, wherein:
   said multi-access controller is formed such that each of said computers is able to effect input and output of a data file independently of the presence of said other computers.

9. A multi-computer system according to claim 6, wherein:
   said schedule master computer normally operates to track the process statuses of said other computers for permitting reformation of the system upon failure of one or more components thereof.

10. A multi-computer system according to claim 6, wherein:
    said schedule master computer effects system reformation by analyzing failures within the system.

* * * * *